United States Patent
Osterland et al.

[11] Patent Number: 5,906,739
[45] Date of Patent: May 25, 1999

[54] MEMBRANE FILTRATION ASSEMBLY

[75] Inventors: Niels Osterland, Sorring; Søren Mondrup Andersen; Niels Ottosen, both of Silkeborg, all of Denmark

[73] Assignee: APV Pasilac A/S, Aarhus, Denmark

[21] Appl. No.: 08/702,632

[22] PCT Filed: Mar. 1, 1995

[86] PCT No.: PCT/DK95/00092

§ 371 Date: Sep. 3, 1996

§ 102(e) Date: Sep. 3, 1996

[87] PCT Pub. No.: WO95/23639

PCT Pub. Date: Sep. 8, 1995

[30] Foreign Application Priority Data

Mar. 2, 1994 [DK] Denmark ................................. 0245/94

[51] Int. Cl.⁶ .................................................. B01D 63/00
[52] U.S. Cl. ................................. 210/321.81; 210/323.2; 210/321.78; 210/321.79; 210/321.9
[58] Field of Search ........................... 210/323.2, 321.78, 210/321.79, 321.81, 321.89, 321.9, 321.6

[56] References Cited

U.S. PATENT DOCUMENTS

| | | | |
|---|---|---|---|
| 4,105,547 | 8/1978 | Sandblom | 210/349 |
| 4,522,717 | 6/1985 | Brust | 210/323.2 |
| 4,526,688 | 7/1985 | Schmidt, Jr. et al. | 210/323.2 |
| 4,704,205 | 11/1987 | Ishii | 210/323.2 |
| 4,929,259 | 5/1990 | Caskey et al. | 210/321.81 |
| 5,525,144 | 6/1996 | Golland | 210/321.81 |
| 5,585,009 | 12/1996 | Fusikata | 210/323.2 |

FOREIGN PATENT DOCUMENTS

| | | |
|---|---|---|
| A1-0020767 | 7/1979 | European Pat. Off. . |
| A2-0039583 | 3/1981 | European Pat. Off. . |
| A-2001796 | 12/1978 | United Kingdom . |
| WO 88/03829 | 11/1987 | WIPO . |

*Primary Examiner*—Ana Fortuna
*Attorney, Agent, or Firm*—McDermott, Will & Emery

[57] ABSTRACT

Membrane filtration assembly where the fluid to be filtered is recirculated on the retentate side of a membrane filter and where the filtered fluid, i.e. the permeate, is recirculated on the permeate side of the membrane filter in such a manner that the two streams are cocurrently passed along the membrane filter. The membrane filter comprises several membrane units in form of tubular supporting structures, each supporting structure comprising one or more filter membranes. The membrane units are mounted in parallel inside a common housing in such a manner that one stream flows inside the membrane units while the other stream flows in a space surrounding said membrane units. Each membrane unit is provided with a separate space designed as a narrow passageway on the inner side defined by the membrane unit and on the outer side defined by a channel tube, the inner cross section of which is 4 to 200% larger than the outer cross section of the membrane unit. The assembly is easy to clean, and it is easy to replace the individual membrane units.

9 Claims, 6 Drawing Sheets

MEMBRANE FILTRATION ASSEMBLY

TECHNICAL FIELD

The present invention relates to a membrane filtration assembly where the fluid to be filtered is recirculated on the retentate side of a membrane filter, and where the filtered fluid, i.e. the permeate, is recirculated on the permeate side of the membrane filter in such a manner that the two streams are passed cocurrently along the membrane filter, which membrane filter comprises several membrane units in form of tubular supporting structures, each supporting structure comprising one or more filter membranes, and where said membrane units are mounted in parallel in a common housing in such a manner that one stream flows inside the membrane units while the other stream flows in a space surrounding the membrane units.

BACKGROUND ART

U.S. Pat. No. 4,105,547 discloses a membrane filtration involving a recirculation of the fluid to be filtered on the retentate side of the filter membrane and a recirculation of the filtered fluid, i.e. the permeate, on the permeate side of the filter membrane. The two streams flow in the same direction, i.e. cocurrently, along the respective sides of the filter membrane so as thereby to ensure a uniform drop of pressure across the entire membrane. The object of such an assembly is to optimize the filtration capacity of the membrane. In practice the suitable equilibrium is obtained by adjusting the pressure on the permeate side. In order to obtain a sufficiently high pressure of the recirculated permeate a high pumping capacity is, however, necessary, especially in case of a high amount of permeate. Such a high requirement to the pumping capacity resulted, however, in operation costs which were considered unacceptable.

EP-PS No. 333,753 describes an improved membrane filtration assembly of the above type, where several membrane units in form of tubular membrane filters with surrounding tubular supporting structures are arranged in parallel in a common collecting space. In order to ensure a suitable, uniform drop of pressure along the permeate side, the collecting space of the membrane is filled with filler bodies. As a result a considerable, mechanical impediment to the flow of the circulating permeate is obtained. In order to retain the filler bodies in the collecting space and in order to distribute the stream of the circulating permeate, means are provided in the known assembly, at least at the inlet side, said means being provided in form of a disk with holes abutting an outer housing defining the collecting space. The disk with holes retains the filler bodies in the collecting space and distributes the stream of circulating permeate thereacross.

The use of filler bodies ensures an adjusted flow resistance to the permeate stream. The system involves, however, also some problems. The replacement of merely a single membrane unit necessitates a removal of all the filler bodies from the entire permeate collecting space. Thus the replacement of a unit is very difficult and time-consuming. In addition, the filler bodies render it difficult to clean the permeate space by way of circulation of cleaning fluid.

It turned out surprisingly that a membrane filtration assembly of the type mentioned in the introduction can be constructed in such a manner that the cleaning is facilitated and the replacement of membrane units is very easy because the use of filler bodies has been completely avoided.

The object of the present invention is to provide an alternative membrane filtration assembly where the above drawbacks of the assembly described in the EP-PS No. 333.753 are avoided while the desired uniform drop of pressure across the entire membrane surface is maintained in a very economical manner.

BRIEF DESCRIPTION OF THE INVENTION

The above object is obtained by means of a membrane filtration assembly, which according to the invention is characterised in that each membrane unit is provided with a separate space in form of a narrow passageway, which on the inner side is defined by the membrane unit and on the outer side by a channel tube of an inner cross section which is 4 to 200% larger than the outer cross section of the membrane unit.

The extent of applicability of the invention appears from the following detailed description. It should, however, be understood that the detailed description and the specific examples are merely included to illustrate the preferred embodiments, and that various alterations and modifications within the scope of protection will be obvious to persons skilled in the art on the basis of the detailed description.

DETAILED DESCRIPTION OF THE INVENTION

The membrane filter assembly according to the invention can be used in connection with the various types of tube or rod-shaped membrane units which in practice are arranged in a common housing.

The assembly according to the invention renders it possible to avoid a large common space on either the retentate side or the permeate side, each membrane unit being provided with a surrounding channel tube in such a manner that the channel housing in which the permeate stream or the retentate stream, respectively, recirculates along the membrane filter is formed by a narrow slot around the membrane unit.

By varying the cross section of the slot it is possible to optimize the velocity of the flow and consequently the drop of pressure of the permeate circulation or correspondingly on the retentate side. Thus it is possible to optimize the system in view of the optimum ratio of the amount of permeate stream to the amount of retentate stream in connection with filtration of various materials. The use of a very narrow slot renders it possible to obtain the desired drop of pressure in case of a very low flow volume, which is very energy-saving compared to other known principles.

According to a preferred embodiment the inventive membrane filtration assembly may be constructed as a module comprising for instance up to nineteen or more membrane units of a hexagonal or circular cross section and mounted in parallel in a common housing.

An insert is mounted in each housing, said insert comprising a hexagonal or circular tube for each membrane unit of an inner diameter of 0.8 to 20, preferably 0.8 to 10, especially 1 to 5 mm larger than the outer diameter of the membrane unit in such a manner that a slot of 0.4 to 10, 0.4 to 5 and 0.5 to 2.5 mm, respectively, is obtained around each unit.

The individual tubes are mounted by means of a disk with holes between inlets and outlets for the permeate or the retentate. As an alternative, a compact block can be provided with the necessary number of tubes or tubular channels.

The permeate can be recirculated through one or more connecting pieces and be distributed in the slots between the units and the insert and further out through one or more additional connecting pieces in the opposite end of the housing. The passing through the slot gives a suitable drop of pressure whereby the drop of pressure for the permeate stream corresponds to the drop of pressure for the retentate stream in such a manner that the same drop of pressure across the entire membrane from the inlet side to the outlet side of the membrane filtration assembly is obtained as in U.S. Pat. No. 4,105,547.

Examples of uses of membrane assemblies of the type in question are especially, but not exclusively, the uses in connection with foodstuffs. Membrane filtration can for instance be used for filtering off proteins and other substances of a specific molecular size, where all proteins are for instance filtered off or where specific molecular sizes are filtered off. Such molecular separations can for instance be used in connection with processing of fruit juices as well as fermented products, such as beer and wine. Membrane filtration is widely used in connection with processing of dairy products, such as for removing milk fat or for utilizing whey proteins in connection with the production of so-called cast cheeses. Furthermore, it possible to use membrane filtration for removing bacteria by a suitable choice of the pore size of the membrane filters.

BRIEF DESCRIPTION OF THE DRAWINGS

The invention is illustrated in greater detail below in connection with the embodiments shown in the drawing, in which FIG. 1 is a side view (FIG. 1A) and a cross-sectional view (FIG. 1B), respectively, of a membrane filtration assembly according to the invention with nineteen membrane units arranged in parallel in a common housing.

BEST MODE FOR CARRYING OUT THE INVENTION

Figure 1A:
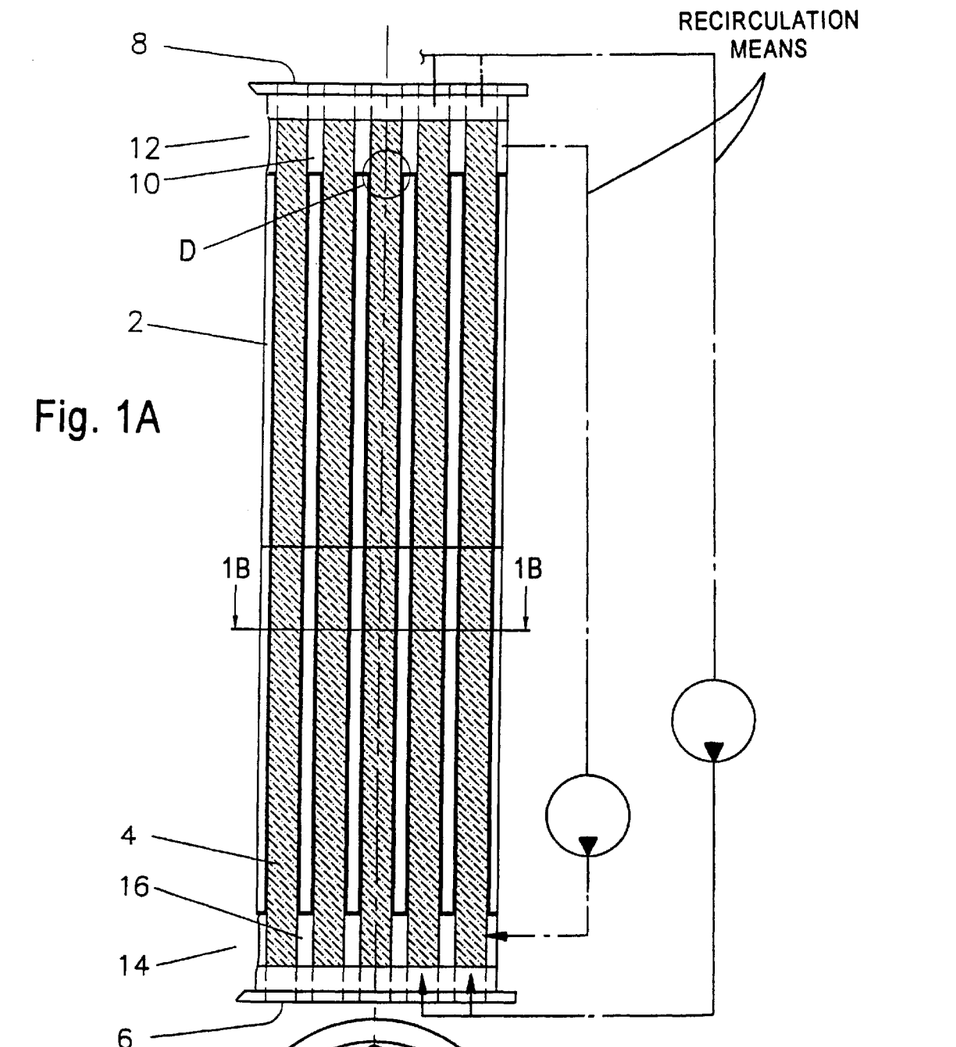
Figure 1B:
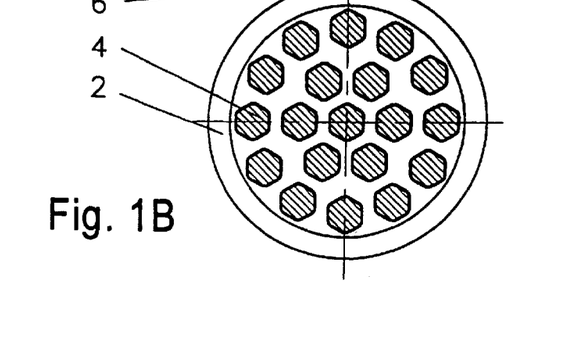
Figure 3:
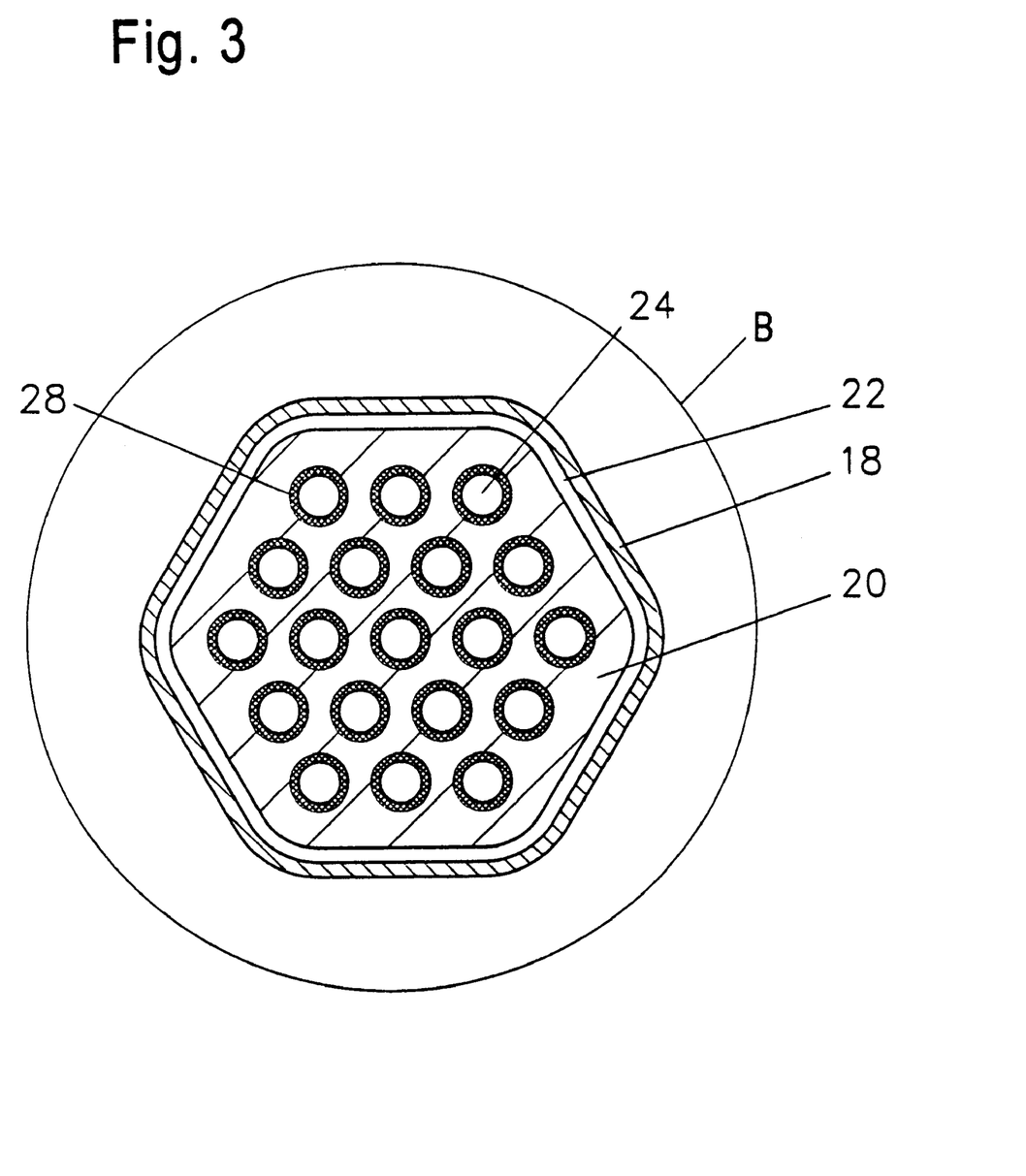
FIG. 3 illustrates a detail marked B in FIG. 2.

The membrane filtration assembly shown in FIG. 1 comprises a surrounding housing 2, in which a total of nineteen identical membrane units 4 are mounted, said membrane units being surrounded by channel tubes defining slot-shaped channels or passageways, cf. the explanation in connection with FIG. 3. The material to be filtered is together with recirculated retentate introduced and distributed in the individual membrane units through retentate inlets 6, and the retentate is removed through retentate outlets 8. The combined retentate stream from the individual membrane units can be recirculated in a conventional manner, usually in form of a partial stream, to the inlet side 6 through a circuit not shown associated with a pump. The permeate stream is removed through a collecting space 10 through a permeate outlet 12 to a circuit not shown associated with a pump, whereby the permeate can be completely or partially recirculated. The recirculation is carried out through a permeate inlet 14 to a distribution chamber 16, in which the permeate is distributed between the slot-shaped channels surrounding the individual membrane units 4.

Figure 2:
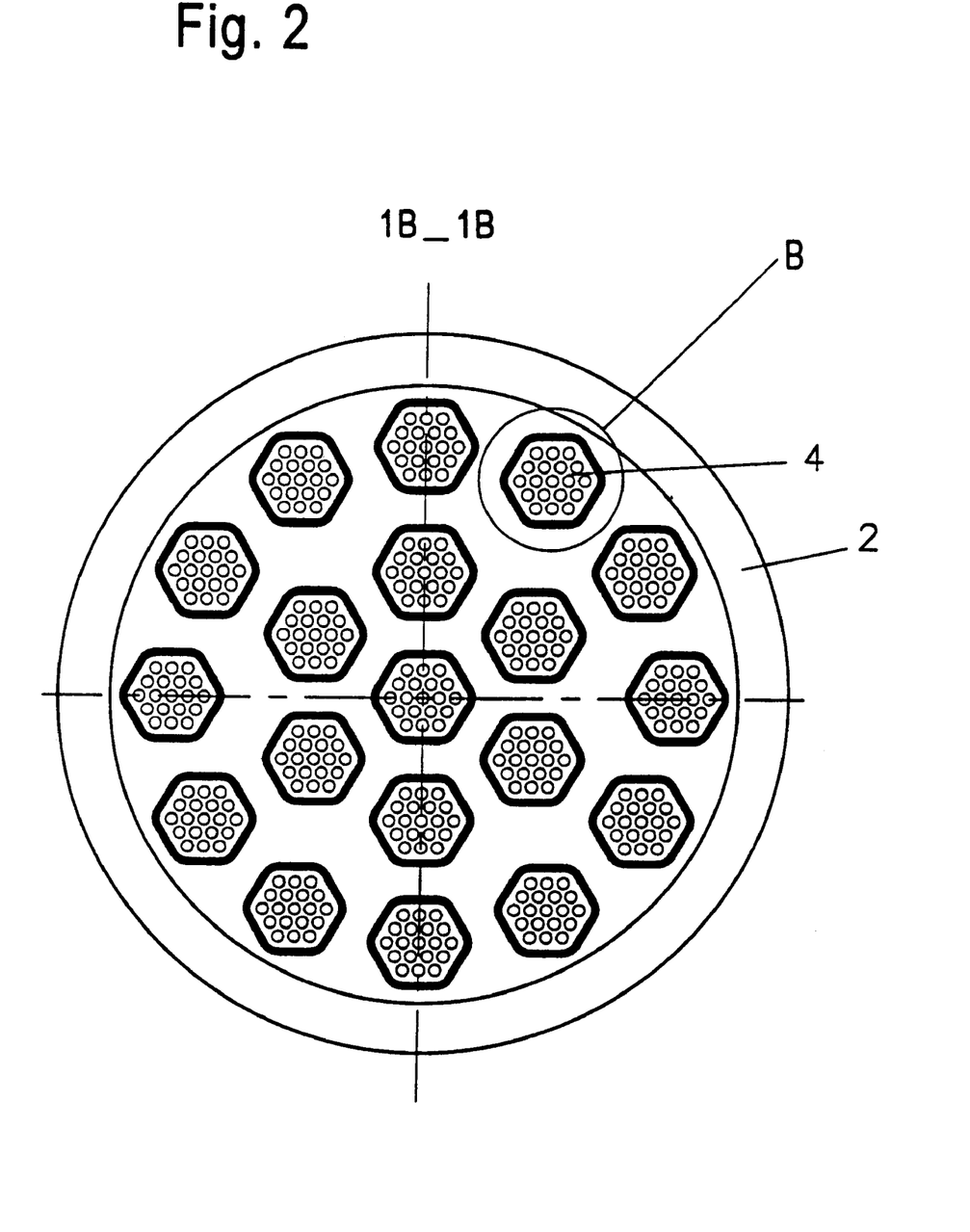
FIG. 2 is a cross-sectional view taken along the line A—A of FIG. 1A.

In order to illustrate the assembly in greater detail, FIG. 2 shows a cross-sectional view seen from the collecting space 10 in FIG. 1, i.e. as indicated by the line A—A. Thus FIG. 2 illustrates the surrounding housing 2 and nineteen membrane units 4, the more detailed cross section of which is described below with reference to FIG. 3 showing a single enlarged membrane unit.

FIG. 3 shows a channel tube 18 with a membrane unit. The channel tube 18 of the shown embodiment is of a substantially hexagonal cross section. A ceramic, porous, externally tubular supporting structure 20 is arranged in the channel tube, said supporting structure being of a substantially corresponding hexagonal outer cross section. A collecting space 22 in form of a narrow, slot-shaped channel or passageway is formed between the channel tube 18 and the supporting structure 20. The supporting structure is of a conventional construction with a plurality of retentate channels 24, each retentate channel being provided with a filter membrane 28 on the inner side. The supporting structure 20 with the filter membranes 28 are taken together also referred to as a membrane unit in the present specification. The free sectional flow area for the retentate stream corresponds in the embodiment shown in FIG. 3 to the sum of the cross sections of the individual retentate channels, while the free sectional flow area for the permeate stream corresponds to the sectional area of the collecting space 22.

Figure 4:
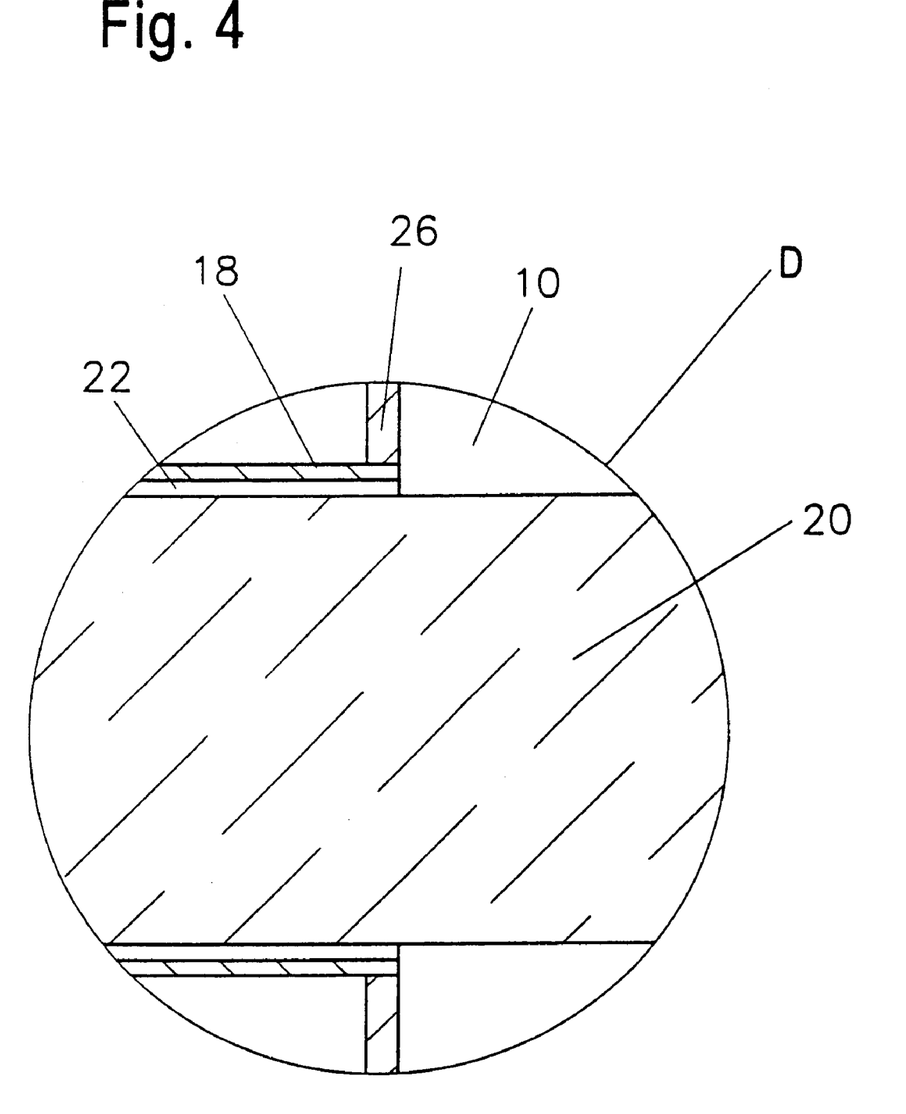
FIG. 4 illustrates an enlarged detail marked D in FIG. 1A, and FIGS. 5 to 8 illustrate alternative embodiments of the detail B shown in FIG. 3.

FIG. 4 shows a detail marked D in FIG. 1 with the ceramic supporting structure 20 introduced in a channel tube 18 forming a slot-shaped collecting space 22. The channel tube 18 is secured to a wall 26 defining the collecting space 10.

The used membrane units with ceramic supporting structures and one or more membranes are, as mentioned, conventional and generally available. Like the structure shown in FIG. 1, it is possible in a practical manner to use for instance nineteen membrane units in which case a typical commercial membrane unit may present a total stream sectional area on the retentate side of 187.5 mm$^2$. When such membrane units are used for building an assembly for a particular filtration purpose, the channel tubes surrounding the membrane units can typically be dimensioned such that the total sectional area of the permeate flow, i.e. the total sectional area of the individual collecting spaces 22 is in the range of 40 to 1,250 mm$^2$, the lower part of the range usually being used, such as between 40 and 500 mm$^2$, especially between 40 and 100 mm$^2$.

The ratio of the sectional area of the permeate stream to the sectional area of the retentate stream, respectively, is, as mentioned, preferably 0.1 to 10, particularly preferred 0.1 to 5, and especially 0.2 to 2.

Figure 5:
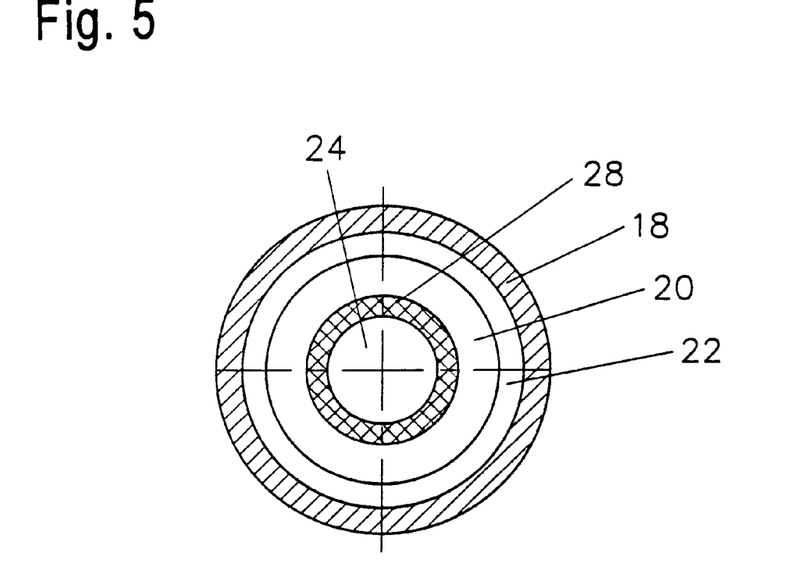

FIG. 5 shows an alternative type of membrane unit with a surrounding channel tube 18. The membrane unit comprises a porous supporting structure 20 with only one retentate channel 24 defined by a filter membrane 28 built into the supporting structure. This membrane unit is in practise used in the same manner as the membrane unit shown in FIG. 3, i.e. in such a manner that the retentate stream flows inside the retentate channel 24 of the unit while the permeate is collected and flows in a surrounding collecting space 22.

Figure 6:
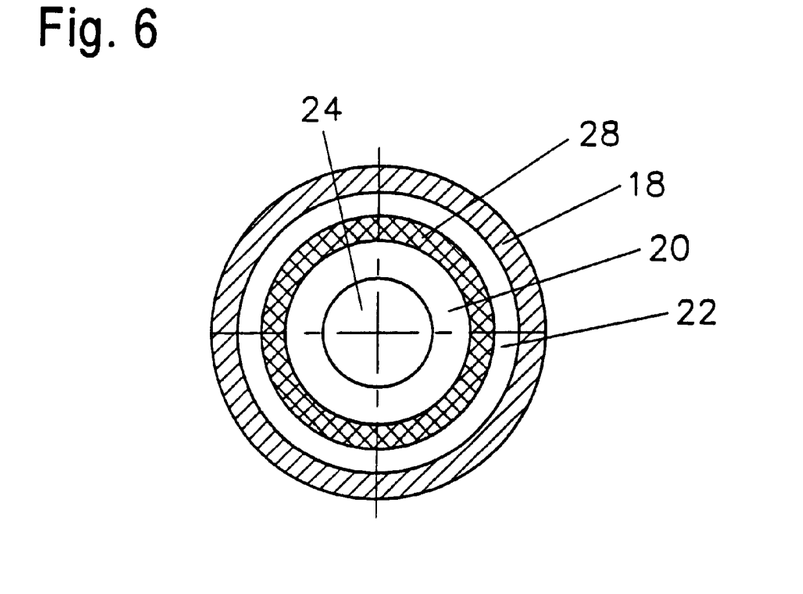

FIG. 6 shows an additional embodiment where the membrane 28 is arranged on the outside of a tubular supporting structure 20 with an inner channel 24. By this embodiment the retentate stream is usually flowing in a retentate space 22 between the membrane 28 and the channel tube 18 while the permeate stream flows inside the inner channel 24.

Figure 7:
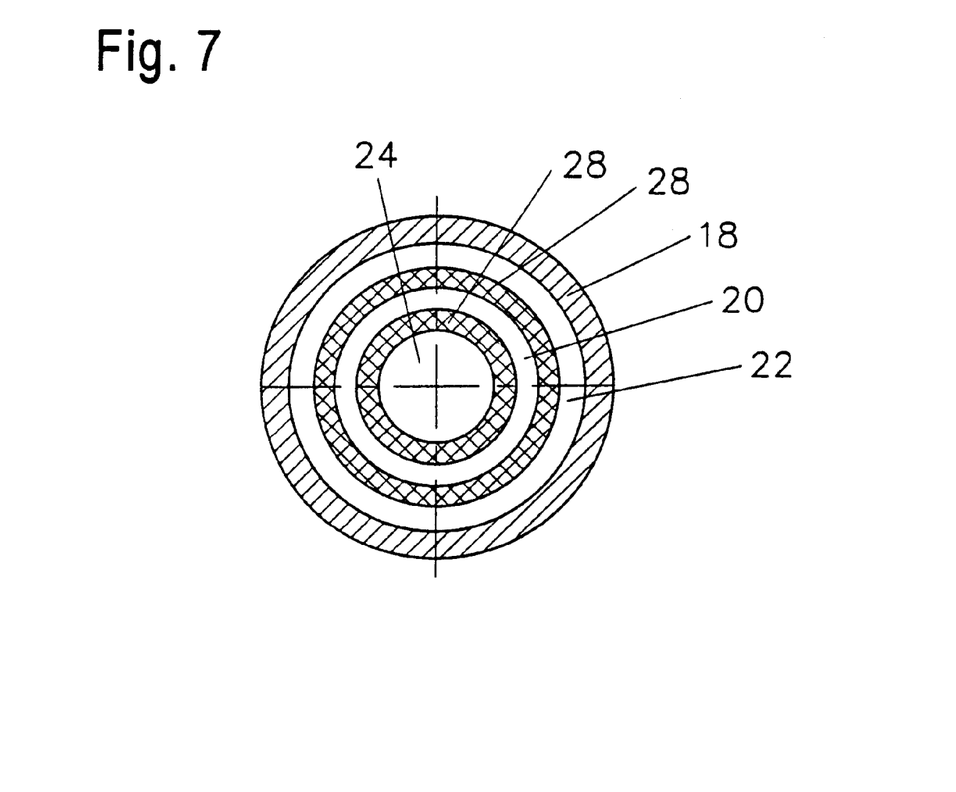

As shown in FIG. 7, it is also possible to divide the membrane 28 into two membrane parts on the inside and outside, respectively, of a tubular supporting structure 20. In this embodiment, it is possible to choose an arbitrary filtration direction, i.e. to allow the retentate stream to either flow in the channel 24 and the permeate stream in the space 22 or vice versa.

Figure 8:
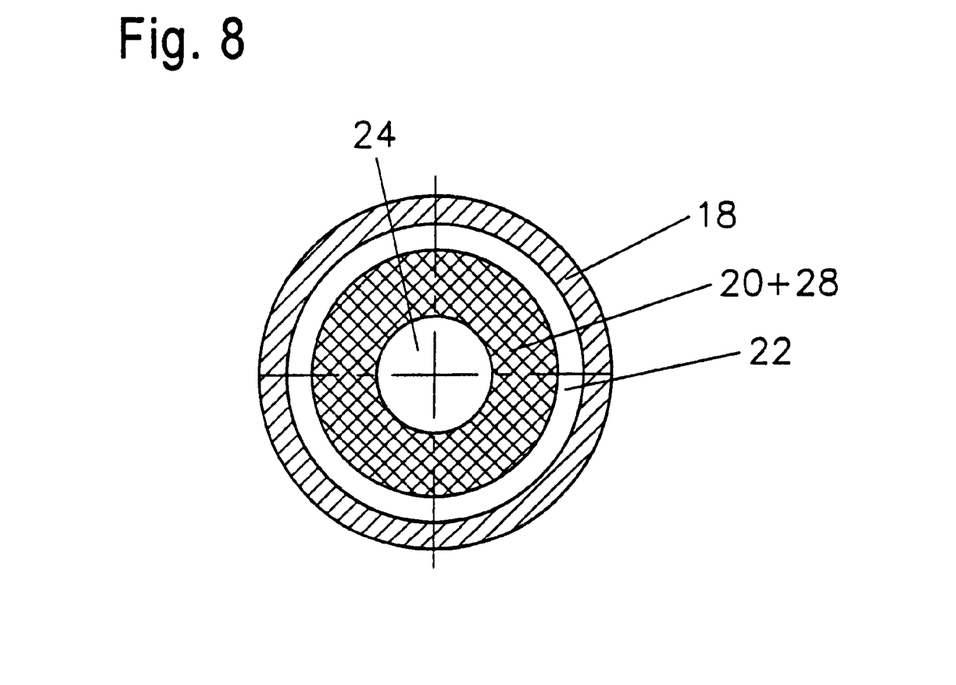

The same applies to the embodiment shown in FIG. 8, where the membrane 28 and the supporting structure 20 form an integrated unit (20+28). Such a unit can be considered a self-supported membrane.

In the embodiments, where the retentate stream flows inside the channels 24 of the supporting structure, the inner cross section of the channel tube 18 is 4 to 200% larger than the outer cross section of the membrane unit, i.e. in the embodiments shown in FIGS. 3 and 5 corresponding to the outer cross section of the tubular supporting structure 20, preferably 4 to 100% larger, especially 4 to 25% larger.

By the alternative embodiments, where the permeate stream is flowing inside the channel 24 of the supporting structure while the retentate stream flows in a surrounding space 22 defined by the membrane unit and the channel tube 18, the sectional ratio can in a similar manner be such that the inner cross section of the channel tube is 4 to 200% larger than the outer cross section of the membrane unit, i.e. in the embodiments shown in FIGS. 6, 7, and 8 the same as the outer cross section of the filter membrane 28. As the retentate stream usually requires a larger cross section than the permeate stream, the particularly preferred ratios are here usually between 100% and 200%, such as between 125 and 175%.

The above description of the invention reveals that it is obvious that it can be varied in many ways. Such variations are not to be considered a deviation from the scope of the invention, and all such modifications which are obvious to the persons skilled in the art are also to be considered comprised by the scope of the accompanying claims.

We claim:

1. A membrane filtration assembly comprising:

a feed inlet for a fluid to be filtered, said feed inlet opening to a retentate side of a membrane filter;

a retentate outlet for a retentate fluid;

first recirculation means for recirculating at least a part of the retentate fluid to the feed inlet a permeate outlet for filtered permeate fluid, second recirculation means for recirculating at least a part of the permeate fluid to a permeate inlet, said inlets, outlets and first and second recirculation means being arranged to maintain a retentate fluid stream on the retentate side of the membrane filter and a permeate fluid stream on a permeate side of the membrane filter in such a manner that the permeate fluid and retentate fluid streams are concurrently passed along the membrane filter with approximately uniform drop in pressure across the membrane, several membrane units in form of tubular supporting structures disposed in the membrane filter, each supporting structure comprising one or more filter membranes said membrane units being mounted in parallel inside a common housing in such a manner that one of the permeate fluid and retentate fluid streams flows inside the membrane units while the other of the permeate fluid and retentate fluid streams flows in a space surrounding said membrane units and in a manner wherein parallel fluid flow between units occurs, each membrane unit being provided with a separate passageway which is defined on the inner side by the membrane unit and on the outer side by a channel tube having an inner cross section which is 4 to 200% larger than the outer cross section of the membrane unit.

2. A membrane filtration assembly as claimed in claim 1, wherein a plurality of channels is provided for retentate fluid, each of said channels having an associate filter membrane and each being disposed in a supporting structure (20), and wherein said channels are connected to the feed inlet and the retentate outlet so that the retentate fluid stream flows in the channels within the supporting structure while the permeate inlet and the permeate outlet are connected with collecting space passageways that surround the membrane units and through which the permeate fluid stream can flow.

3. A membrane filtration assembly as claimed in claim 1, wherein each channel and its associated filter membrane (28) is built into each supporting structure, and wherein the channels are connected to the feed inlet and the retentate outlet to permit the retentate fluid stream to flow in the channel within the supporting structure while the permeate inlet and the permeate outlet are connected with collecting space passageways that surround the membrane units and through which the permeate stream can flow.

4. A membrane filtration assembly as claimed in claim 1, wherein each filter membrane is arranged on an outer side of a supporting structure and wherein the permeate inlet and the permeate outlet are connected with the channels so that the permeate fluid stream can flow inside the supporting structure and the feed inlet and the retentate outlet (8) are connected with retentate space passageways which surround the membrane units and through which the retentate can flow.

5. A membrane filtration assembly as claimed in claim 1, wherein each filter membrane is divided into two membrane parts, the two parts being disposed on the outer side and the inner side, respectively, of a supporting structure.

6. A membrane filtration assembly as claimed in claim 1, wherein each filter membrane is a self-supported membrane wherein the membrane and a supporting structure form an an integral unit.

7. A membrane filtration assembly as claimed in claim 1, wherein the tubular supporting structure and the channel tubes each have a substantially circular cross section.

8. A membrane filtration assembly as claimed in claim 1, wherein the tubular supporting structure and the channel tubes each have a substantially hexagonal cross section.

9. A membrane filtration assembly as claimed in claim 1, wherein the ratio of the free flow sectional area of the permeate fluid stream to the free flow sectional area of the retentate fluid stream is 0.1 to 10.

* * * * *

UNITED STATES PATENT AND TRADEMARK OFFICE
CERTIFICATE OF CORRECTION

PATENT NO. : 5,906,739
DATED : May 25, 1999
INVENTOR(S) : Niels Osterland, et al.

It is certified that error appears in the above-identified patent and that said Letters Patent is hereby corrected as shown below:

Column 3, lines 30 and 31, delete "FIG. 1 is a side view (FIG. 1A) and a cross-sectional view (FIG. 1B)" and insert –FIGS. 1A and 1B are a side view and cross-sectional view--.

Column 3, line 34, change "A-A" to --1B-1B--.

Column 3, line 67, change "A-A" to --1B-1B--.

Signed and Sealed this

Seventh Day of December, 1999

*Attest:*

Q. TODD DICKINSON

*Attesting Officer*     *Acting Commissioner of Patents and Trademarks*